US007892631B2

(12) United States Patent
Bauer

(10) Patent No.: US 7,892,631 B2
(45) Date of Patent: Feb. 22, 2011

(54) LIGHTWEIGHT BOARD AND PROCESS FOR ITS PRODUCTION

(75) Inventor: Dieter Bauer, Münchberg (DE)

(73) Assignee: Rehau AG & Co., Rehau (DE)

( * ) Notice: Subject to any disclaimer, the term of this patent is extended or adjusted under 35 U.S.C. 154(b) by 651 days.

(21) Appl. No.: 11/367,711

(22) Filed: Mar. 6, 2006

(65) Prior Publication Data

US 2006/0210777 A1 Sep. 21, 2006

(30) Foreign Application Priority Data

Mar. 4, 2005 (DE) ....................... 10 2005 010 565

(51) Int. Cl.
*B32B 7/02* (2006.01)

(52) U.S. Cl. ....................... 428/218; 52/539; 52/506.01; 52/800.11; 52/800.1; 52/802.11; 52/802.1; 52/506.08; 52/506.07; 52/588.1; 52/579; 52/408; 52/412; 428/68; 428/76; 428/174; 428/215

(58) Field of Classification Search ................... 428/76, 428/174, 215, 68; 52/309.4, 592.1, 392, 52/586.1, 800.11, 800.1, 802.11, 802.1, 506.08, 52/408, 412, 539, 506.01, 506.07, 588.1, 52/579
See application file for complete search history.

(56) References Cited

U.S. PATENT DOCUMENTS 3,755,031 A * 8/1973 Hoffman et al. .............. 156/79

(Continued)

FOREIGN PATENT DOCUMENTS

DE 3402923 A1 8/1985

(Continued)

OTHER PUBLICATIONS

Matweb, mateirals database, for American Black Ash (Brown Ash) Wood. Matweb, mateirals database, for American Red Oak Wood. Material web (MatWeb) Polycarbonate material data sheets.*

(Continued)

*Primary Examiner*—Tamra L Amakwe
(74) *Attorney, Agent, or Firm*—Venable LLP; Robert Kinberg; Ryan M. Flandro

(57) ABSTRACT

The invention pertains to a lightweight board with two thin-walled top layers and at least one core layer located between the top layers and connected to these, and a process to manufacture this. The process to manufacture the invented lightweight board is characterised by a first process stage in which a groove is made in at least one longitudinal side of the lightweight board, a profile strip is inserted in a second process stage into the groove in the lightweight board and a further profile strip is attached in a third stage on the previously attached profile strip. The process to manufacture another invented lightweight board is characterised by a first process stage in which a groove is made in at least one longitudinal side of the lightweight board, a profile strip is inserted in a second process stage into the groove in the lightweight board, the profile strip projecting over the groove in the lightweight board is removed in a third process stage and a further profile strip is attached to the previously trimmed profile strip in a fourth process stage.

21 Claims, 3 Drawing Sheets

1

U.S. PATENT DOCUMENTS

| | | | | |
|---|---|---|---|---|
| 4,095,008 | A * | 6/1978 | Sundstrom et al. | 428/215 |
| 4,514,449 | A * | 4/1985 | Budich et al. | 428/76 |
| 4,748,780 | A * | 6/1988 | Vinther | 52/309.3 |
| 5,950,389 | A * | 9/1999 | Porter | 52/586.1 |
| 6,029,416 | A * | 2/2000 | Andersson | 52/592.1 |
| 6,131,521 | A * | 10/2000 | Nelson et al. | 108/27 |
| 6,183,585 | B1 * | 2/2001 | Kelley | 156/182 |
| 6,233,896 | B1 * | 5/2001 | Coup | 52/586.1 |
| 6,253,523 | B1 * | 7/2001 | McKinnon | 52/700 |
| 6,481,170 | B1 * | 11/2002 | Savenok et al. | 52/288.1 |
| 7,614,189 | B2 * | 11/2009 | Smerud et al. | 52/211 |

FOREIGN PATENT DOCUMENTS

| | | | |
|---|---|---|---|
| DE | 86 24 880.4 | U1 | 9/1986 |
| DE | 195 06 158 | A1 | 8/1996 |
| DE | 103 13 055 | A1 | 10/2004 |
| WO | WO 0107725 | A1 * | 2/2001 |

OTHER PUBLICATIONS

Lexan(TM) material data sheet Diab H material data sheet. Diab Divinycell PX 60 and 150 material data sheets Diab Klegecell R260 mateiral data sheets.*

Australian Government number change.*

Dialogue Web Records.*

German Office Action dated Mar. 4, 2005, issued in DE 10 2005 010 565.3.

* cited by examiner

LIGHTWEIGHT BOARD AND PROCESS FOR ITS PRODUCTION

CROSS-REFERENCE TO RELATED APPLICATION

This application claims the priority of German Application 10 2005 010 565.3 filed Mar. 4, 2005, the subject matter of which is incorporated herein by reference. The disclosure of all U.S. and foreign patents and patent applications mentioned below are also incorporated herein by reference.

BACKGROUND OF THE INVENTION

The invention pertains to a lightweight board with two thin-walled top layers and at least one core layer located between the top layers and connected to them, and a process to manufacture this.

A similar lightweight board is known from DE 19506158 A1, in which a core is covered on two sides by at least two boards. This lightweight board has a retaining and finishing profile at its longitudinal sides, which has a base section with a visible, connecting surface and a covering surface located opposite this, and with an anchoring facility located on the covering surface and which engages in the fitted state in the core of the lightweight board. This retaining and finishing profile is pressed into the longitudinal sides of the lightweight board, causing the core of the lightweight board to be damaged at this point, and the retaining and finishing profile is glued to the top layers of the lightweight board with adhesive applied to the anchoring facility.

However, this retaining and finishing profile has the disadvantage that different retaining and finishing profiles must be manufactured for each geometry and shape of the lightweight board, mainly in dependence on the thickness and particularly on the tolerance of the top layers. Another disadvantage of this lightweight board is that the top layers of the lightweight board are pushed or stretched apart when the anchoring facility is pressed into the core layer, which is caused by the different tolerances of the anchoring facility and the different distances between the individual top layers.

A further disadvantage is that this solution can cause the core layer to be detached from one or both of the top layers.

Another similar lightweight board is described in DE 103 13 055 A1. This describes a process and a device to manufacture a lightweight board from two thin-walled top layers which form the upper and lower sides of the board and at least one core layer made of a light filler and located between and glued to the top layers.

The process to manufacture this lightweight board is characterised by the application of an adhesive layer to one side of the core layer in one pass and the subsequent joining of the core layer with the first top layer. An adhesive layer is then applied to the other side of the core layer and the second side of the core layer is joined to the second top layer and the top layers are pressed together with the core layer. It is also described that, to manufacture this lightweight board, frame batons can be located at least at the longitudinal sides of the lightweight board and glued to the top layers. The described lightweight board can therefore be manufactured without frame batons located at the longitudinal sides or with these frame batons at the longitudinal sides. The lightweight board is therefore manufactured with unprotected longitudinal sides and also with frame batons proportioned according to the cross-section and geometry of the lightweight board, which enclose the longitudinal sides. The disadvantage of this process is that although production is to operate continuously, each lightweight board must be assembled step by step as an individual part. Particularly when frame batons are used, the disadvantage is that these must be adapted in their dimensions to the top layers of the lightweight board in production and fully automatic, inline production is therefore unviable. Another disadvantage of the lightweight board is that the frame batons glued to the top layers lead to a situation due to the known production tolerances, particularly in woodworking, in which the core layer does not fully adhere to the top layers and is damaged when pressed to the top layers. For the lightweight board manufactured by this process without glued frame batons, the longitudinal sides must be protected later against damage by additional steps of work and process stages. When the described frame batons are used, it is also necessary to conduct an additional time-consuming and expensive step of work to apply additional covering elements to the longitudinal sides of the lightweight board. The manufacture of these lightweight boards is therefore uneconomical, particularly in view of the fact that it is necessary to protect the longitudinal sides.

SUMMARY OF THE INVENTION

This is where the invention sets in with the objective of improving the current standard of technology and to describe a lightweight board which can be manufactured economically and fully automatically, with longitudinal sides which are permanently protected and sealed, in which the employed covering elements of the longitudinal sides are low in weight, firmly bonded to and strengthening the lightweight board, and in which lightweight boards with freeform shapes can be manufactured for the first time.

According to the invention, this is solved by the characteristic features of claims 1 and 2 and claims 20 and 21.

Further advantageous progressions are described in the sub-claims.

The process to manufacture the invented lightweight board is characterised by a first process stage in which a groove is made in at least one longitudinal side of the lightweight board. In a second process stage, a profile strip is inserted into the groove of the lightweight board and, in a third step, a further profile strip is attached to the previously inserted profile strip.

The process to manufacture another lightweight board by the invention is characterised by a first process stage in which a groove is made in at least one longitudinal side of the lightweight board. In a second process stage, a profile strip is inserted into the groove in the lightweight board and, in a third step, the profile strip projecting over the groove in the lightweight board is removed. In a fourth process stage, a further profile strip is attached to the previously trimmed profile strip.

Surprisingly, it has been found that the employment and use of profile strips made of thermoplastically workable materials permit such lightweight boards to be manufactured economically and can quickly seal the longitudinal sides. By using profile strips from the group of polyolefines, polystyrenes, styrene copolymers, polyvinyl chloride, polycarbonate, polyester, polyamide, ethylene vinyl acetate or similar materials, the invented lightweight board can be manufactured fully automatically and economically and for each specific requirement profile. A decisive advantage is that it is now possible for the first time to manufacture such lightweight boards in so-called freeform shapes such as with rounded corners, circular or oval, which can be sealed at their longitudinal sides.

It has been found to be an advantage if the profile strip inserted in the groove of the lightweight board and then trimmed has a lower density than the profile strip attached subsequently.

On one hand, the use of a thermoplastically workable material with a low density has a positive effect on the weight of the invented lightweight board. On the other hand, it was surprisingly found that the mechanical trimming, for example by routing the part of the profile strip projecting over the groove in the lightweight board in a continuous process results in an increase in the surface of the profile strip, by which the subsequent attachment of a further profile strip can be implemented fully automatically, quickly and by amalgamation.

It is also an advantage that, with a ratio of the density of the profile strip inserted in the groove of the lightweight board to that of the subsequently attached profile strip of 0.1 results in a balanced cost effectiveness of the employed thermoplastically workable materials with the mechanical properties which can be achieved with them. A further advantage is the use of a profile strip inserted into the groove in the lightweight board with a density of 0.20 g/cm$^3$ to 0.85 g/cm$^3$, preferably 0.40 to 0.70 g/cm$^3$ and, particularly after the mechanical trimming of the profile strip projecting over the groove in the lightweight board, a so-called foam structure is exposed, which can be described as cavitated and porous. In this way, the adhesion of the subsequently attached profile strip, which usually has a decor matching that of the top layers of the lightweight board, is significantly improved by the penetration of the adhesive into the cavitated and porous surface of the routed lower profile strip. Due to this microporous structure, the profile strip has openings on its surface, some of which become larger inside. With these, it is possible to achieve an adhesion quality comparable with the known adhesion, for example of thermoplastically workable edgebands on the longitudinal sides of chipboards.

It has been found to be a further advantage if a profile strip inserted into the groove in the lightweight board has a structured surface, preferably with a roughness depth of 5 μm to 40 μm, preferably 10 μm to 25 μm, which also permits a very good adhesive connection between the thermoplastically workable profile strips to be achieved. With the differently adjustable, structured surface which can be achieved by various means in the production process of the profile strip to be inserted into the groove in the lightweight board, such as chemical blowing agents (e.g. bicarbonate, sulfonhydracide, azodicarbonamide), physical blowing agents (e.g. tentane, heptane) and also physical foaming (e.g. with carbon dioxide), the sealing of the longitudinal edge of the invented lightweight board can economically achieve all technical requirements and standards with such profile strips.

To further increase the strength of the adhesive connection between the inserted profile strips, these are partially coated with an adhesive primer system on their surfaces facing the groove. This adhesive primer system is chosen from the group of the polyolefines, polystyrenes, styrene copolymers, polyvinyl chloride, polycarbonate, polyester, polyamide, ethylene vinyl acetate or similar materials, in which the adhesive primer system and the employed adhesive system can be matched with the thermoplastically workable materials of the profile strips such that an optimum adhesion quality and an optimum appearance of the invented lightweight board can be achieved. It is also within the scope of the invention that the adhesive primer system can be employed only as required and accordingly proportioned.

It was also surprisingly found that the profile strip inserted into the groove of the lightweight board can be manufactured from a recycled thermoplastically workable material, which also has a positive effect on the costs and economy of the lightweight board.

However, it is also within the scope of the invention that the profile strip inserted into the groove in the lightweight board is proportioned such that it can be frictionally connected in the groove. Another advantage of the profile strip inserted into the groove in the lightweight board, when the thickness is approximately equivalent to the depth of the groove in the lightweight board, is that subsequent mechanical trimming, for example by routing, is unnecessary because the proportions of the profile strip correspond with the geometry of the groove in the lightweight board.

By the use of a foamable, thermoplastically workable material and the thereby achievable structured surface with a defined roughness for the lower profile strip, the next profile strip, which bears the decor, can also be connected adhesively in amalgamation with this lower profile inserted into the groove in the lightweight board.

However, it is also within the scope of the invention that the surface of the profile strip inserted into the groove in the lightweight board can be optimised, for example by flame treatment, corona discharge, plasma treatment, or also a primer coating, to optimise the adhesive connection, so that a deliberate activation of the surface of the profile strip occurs.

A further advantage is if the profile strip attached to the profile strip inserted into the groove in the lightweight board has a corresponding surface activation on its surface facing this profile strip to optimise the adhesive connection.

A further advantage of the invented lightweight board is that the profile strips, consisting of the thermoplastically workable material, can be manufactured by the known extrusion or co-extrusion process and are economically available in reels of approx. 100 m length, so that continuous production characterised by few machine standstill periods is possible for the manufacture of the invented lightweight board. Due to the advantageous employment of the profile strips made of thermoplastically workable materials, the longitudinal sides of the invented lightweight board can be quasi sealed, as double sealing is achieved by the two attached profile strips.

Due to their material properties, the profile strips themselves are insensitive to moisture and do not swell or corrode, so that the invented lightweight board is positively influenced in its intended use and is superior to the current standard of technology.

However, it is also within the scope of the invention that the profile strips cover all longitudinal edges of the lightweight board, so that all-round protection is achievable.

BRIEF DESCRIPTION OF THE DRAWINGS

The invented lightweight board is described below by the example of an example application, without restriction of the invention.

The following is shown.

DETAILED DESCRIPTION OF THE INVENTION

Figure 1A:
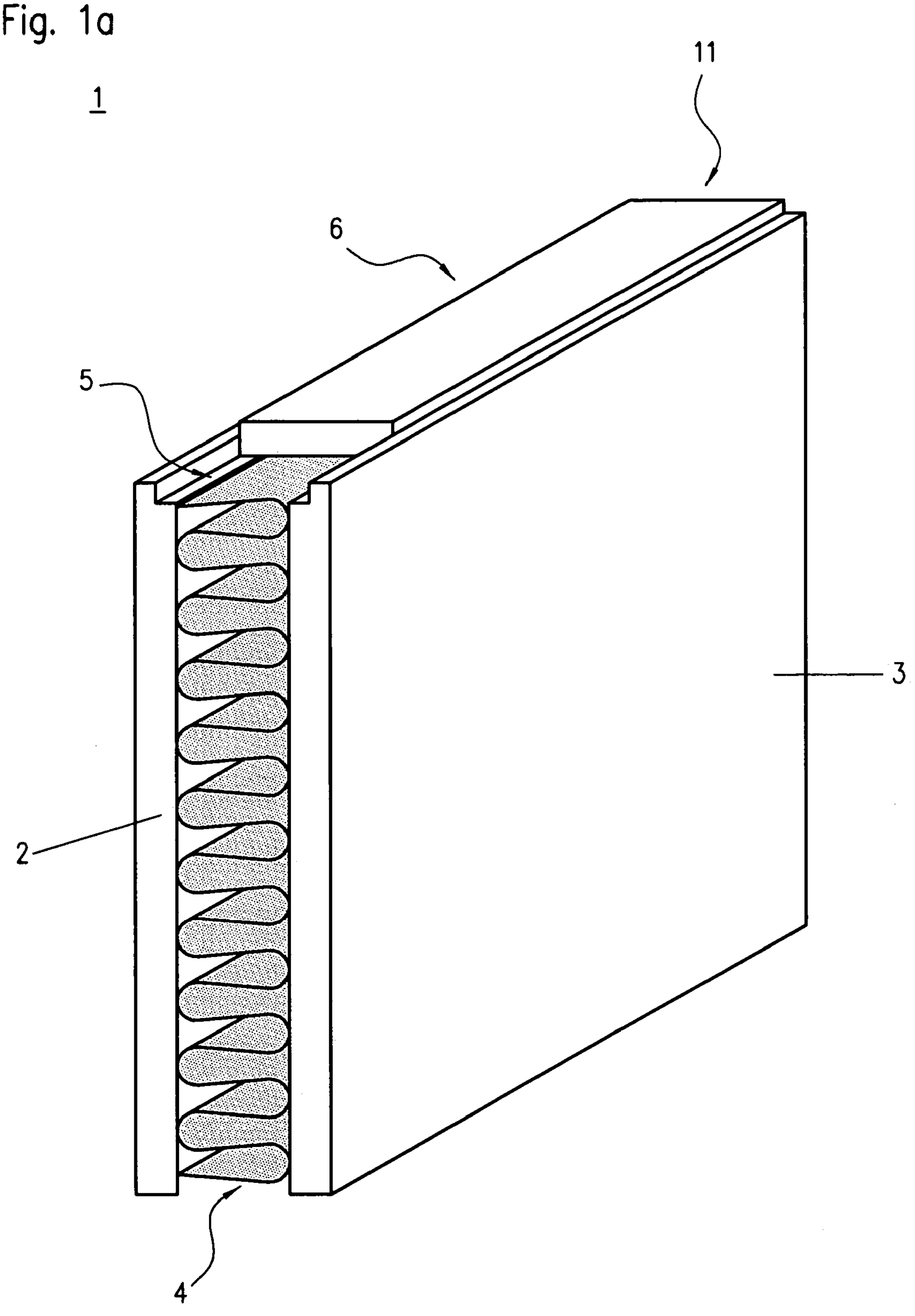
FIG. 1*a-c* Perspective drawing of an invented lightweight board.

FIG. 1 a depicts a perspective drawing of an invented lightweight board 1. Lightweight board 1 has a rectagonal cross-section and, in this example application, consists of the two opposing thin-walled top layers 2, 3, which are arranged approximately parallel to each other. Between the top layers 2, 3, a core layer 4 is arranged and connected to these, which has an approximately S-shaped structure in this example application, in which a honeycomb structure with a corresponding proportion of air spaces is possible and in which this core layer 4 may be made of paper or similar materials. A groove 5 is made in one side 11 of the lightweight board 1. This groove 5 is most advantageously made by routing in the side 11 of the lightweight board 1. In this example application, the groove 5 is proportioned such that an L-shaped recess is formed in each of the thin-walled top layers 2, 3, whose openings are opposite each other. However, it is also within the scope of the invention that the groove 5 is not L-shaped and rectagonal in the top layers 2, 3 as in this example application, but may be at an acute or obtuse angle to the longitudinal sides of the top layers 2, 3. A profile strip 6 is inserted in the groove 5 of the lightweight board, which is connected by adhesion in this example application to the approximately L-shaped recesses in the top coats 2, 3. The profile strip 6 may be manufactured from a recycled styrene copolymer by a known extrusion process. The chemical blowing agent azodicarbonamide is added to this thermoplastically workable material of the profile strip 6, so that the profile strip 6 has a density of approximately 0.6 g/cm$^3$. In this example application, the thickness of the profile strip 6 is approximately equivalent to twice the depth of the groove 5 in the lightweight board 1. In a fully automated, continuous process, the lightweight board 1 passes on one of the top layers 2, 3 horizontally through a known profile strip glueing machine, so that the profile strip 6 is inserted continuously and fully automatically in the groove 5 in the lightweight board 1. In a second process stage, the longitudinal edge 11 of the lightweight board 1 sealed by the profile strip 6 passes through a known routing machine, so that the part of the profile strip 6 projecting over the groove 5 in the lightweight board 1 is routed flush with the side 11 of the lightweight board 1. This achieves a side 11 of the lightweight board 1 which is fully sealed by the routed profile strip 6, which has an optimum surface for the attachment of the next profile strip 7 due to the foam structure of the profile strip 6. Due to the mechanical trimming, for example by routing, of the part of the profile strip 6 projecting over the groove 5 in the lightweight board 1, an adhesion-optimised, enlarged, structured surface of the profile strip 6 is created, in which the exposed foam structure is cavitated and porous, so that the adhesion of the subsequently attached profile strip 7 is substantially improved by the penetration of the adhesive system into this cavitated and porous surface.

Figure 1B:
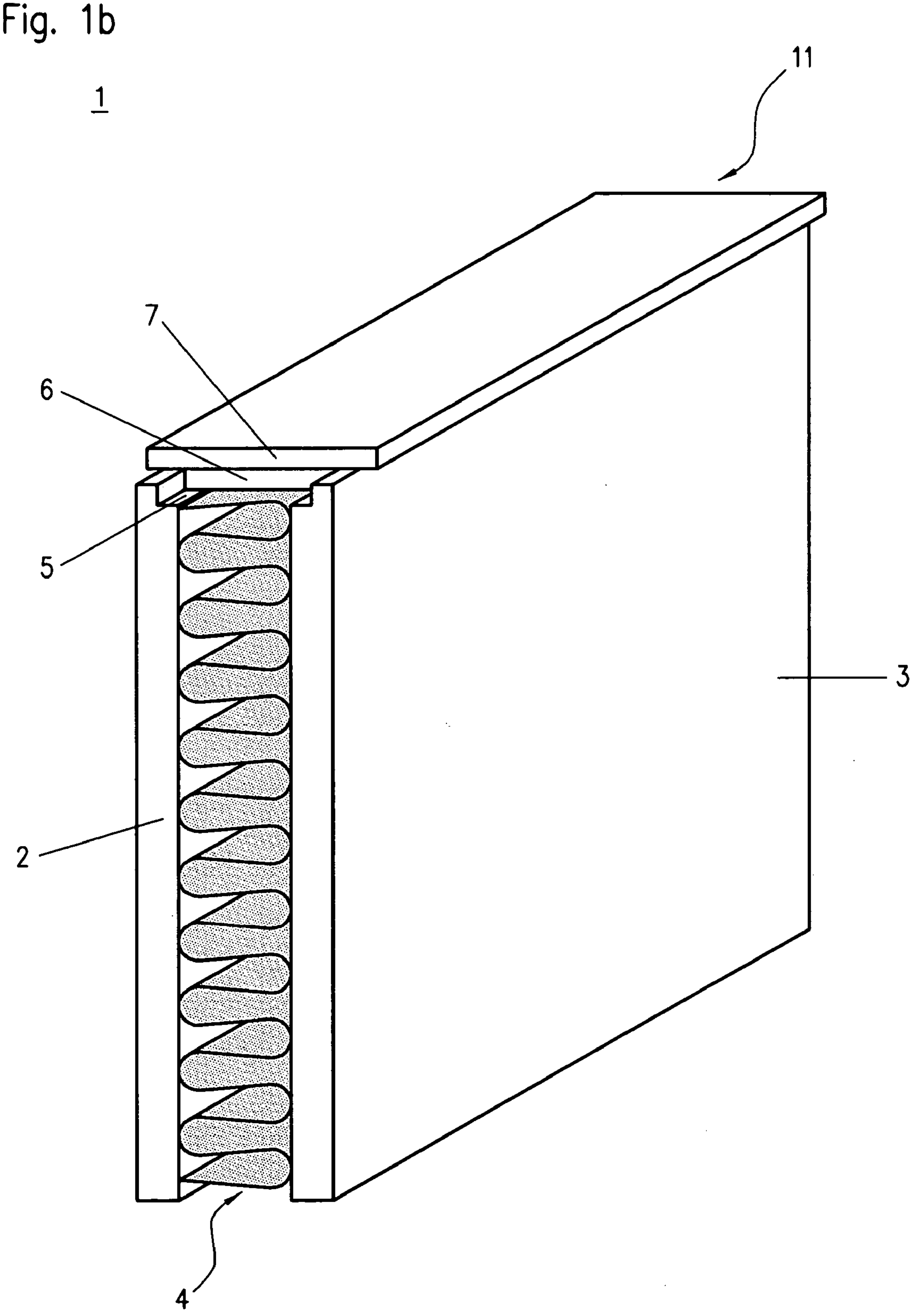

FIG. 1*b* shows the invented lightweight board 1, in which the profile strip 6 inserted in the groove 5 in the lightweight board is flush with the side 11 of the lightweight board 1. The profile strip 7, which has a decor on the side facing away from the side 11 of the lightweight board 1 and which may match the decor of the top layers 2, 3 of the lightweight board 1, is then attached to this surface, which may be additionally activated by corona treatment. An adhesive system such as a hot-melt glue from the group of the polyurethanes is then applied to the surface of the profile strip 6 and the surface formed on the side 11 of the lightweight board 1 and the profile strip 7 is attached in a next process stage. The profile strip 7 is generally a little wider than the side 11 of the lightweight board 1, so that production-related tolerances in the manufacture of the lightweight board 1 can be compensated. By the attachment of the profile strip 7, a so-called “double sealing” of the lightweight board 1 is created, by which the core layer 4 is protected against possible external effects.

The achievable adhesion strength of the glued joint between the profile strip 6 and the profile strip 7 is greater than the tearing strength of the thermoplastically workable material of the profile strips 6, 7.

Figure 1C:
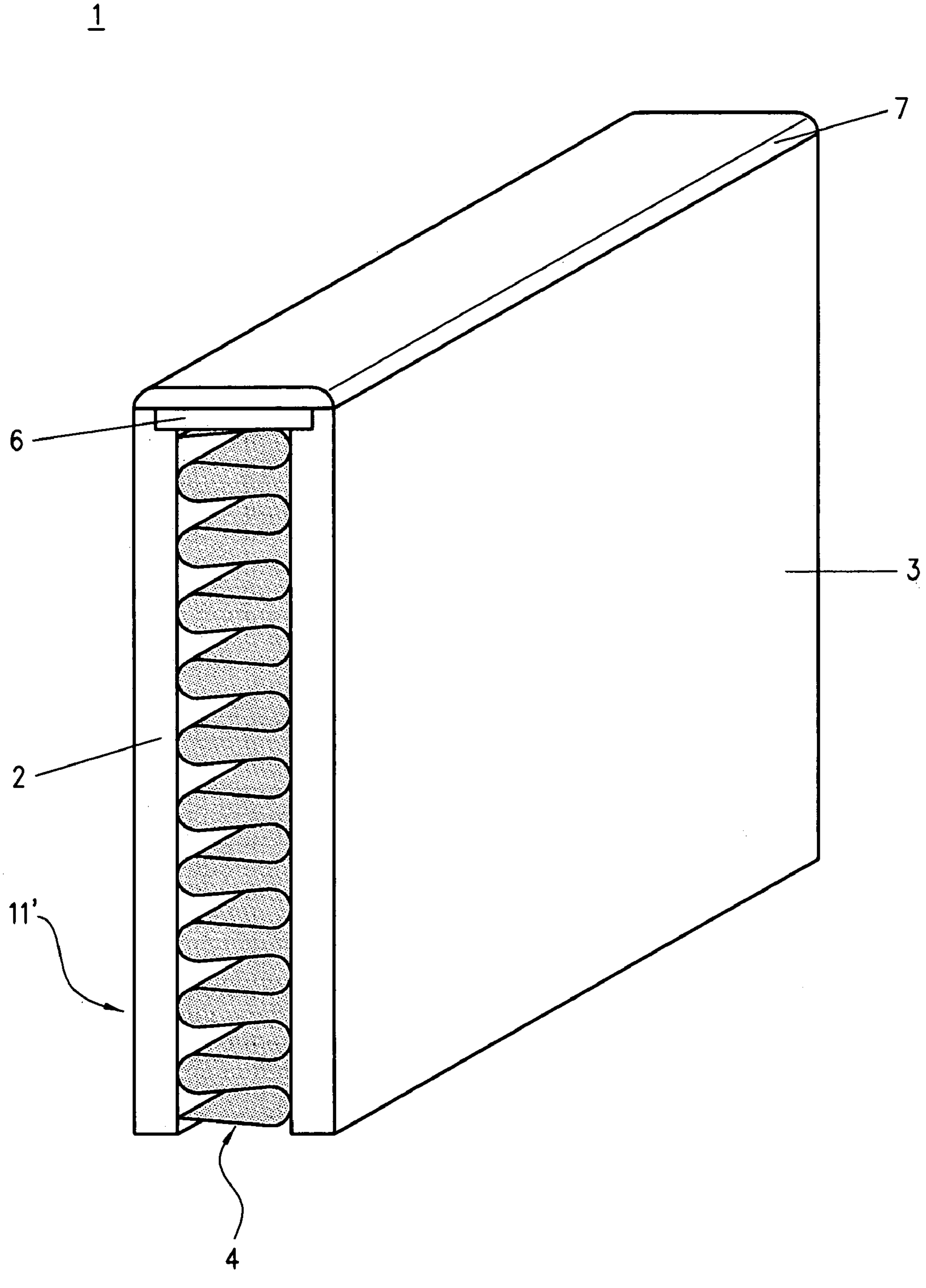

FIG. 1*c* shows the invented lightweight board 1, in which the edges of the profile strip 7 projecting over the longitudinal side 11 of the lightweight board 1 have been trimmed flush with the top layers 2, 3 and an additional, visually attractive radius has been applied to the approximately prismatic cross-section of the profile strip 7 at its upper edges. A further advantage of the use of thermoplastically workable profile strips 6, 7 is that until now it has only been possible to manufacture rectagonal lightweight boards 1 by the known standards of technology, as the employed frame batons cannot be used for required freeform shapes such as radii, circular lightweight boards 1 etc. However, it is also within the scope of the invention that other sides 11' of the lightweight board can be sealed with such profile strips 6, 7 according to the requirement profile.

The invention has been described in detail with respect to preferred embodiments, and it will now be apparent from the foregoing to those skilled in the art, that changes and modifications may be made without departing from the invention in its broader aspects, and the invention, therefore, as defined in the appended claims, is intended to cover all such changes and modifications that fall within the true spirit of the invention.

What is claimed is:

1. A lightweight board comprising:
first and second layers,
at least one core layer located between and joined to the first and second layers,
a groove made in at least one longitudinal side of the lightweight board between the first and second layers,
a first profile strip having a microporous foam structure inserted in the groove and connected to the first and second layers, so that a surface of the first profile strip faces away from the groove and is flush with the side of the lightweight board, and
a second profile strip attached to said surface of the first profile strip facing away from the groove.

2. The lightweight board according to claim 1, wherein at least one of the first and second profile strips consists of a thermoplastic processed material.

3. The lightweight board according to claim 1, wherein at least one of the first or second profile strips is selected from the group consisting of polyolefins, polystyrenes, styrene copolymers, polyvinyl chloride, polycarbonates, polyester, polyamide, ethylene vinyl acetate and similar materials.

4. The lightweight board according to claim 1, wherein the first profile strip has a lower density than the second profile strip.

5. The lightweight board according to claim 1, wherein a ratio of the density of first profile strip to the density of the second profile strip is at least 0.1.

6. The lightweight board according to claim 1, wherein the first profile strip has a density of approximately 0.2 g/cm$^3$ to approximately 0.85 g/cm$^3$.

7. The lightweight board according to claim 1, wherein said surface and the first profile strip facing away from the groove is at least a partially structured surface.

8. The lightweight board according to claim 7, wherein the structured surface of the first profile strip has a roughness depth of approximately 5 μm to 40 μm.

9. The lightweight board according to claim 1, wherein before removal of the portion of the first profile strip projecting over the groove a thickness of the first profile strip is greater than a depth of the groove in the lightweight board.

10. The lightweight board according to claim 1, wherein at least one of the first or second profile strips has at least partially an adhesion primer system at a side facing the groove of the lightweight board.

11. The lightweight board according to claim 10, wherein the adhesion primer system is selected from the group consisting of PVC copolymers and polyurethanes.

12. The lightweight board according to claim 1, wherein at least one of the first or second profile strips has at least partially a surface activator at a side facing the groove of the lightweight board.

13. The lightweight board according to claim 1, wherein the first profile strip is amalgamated into the groove of the lightweight board.

14. The lightweight board according to claim 13, wherein the amalgamated connection employs an adhesive system selected from the group consisting of polyamides, ethylene vinyl acetate, polyolefins, polyurethanes and similar materials.

15. The lightweight board according to claim 1, wherein the first profile strip is frictionally connected into the groove of the lightweight board.

16. The lightweight board according to claim 1, wherein the second profile strip is amalgamated with the first profile strip.

17. The lightweight board according to claim 1, wherein an adhesive strength of the connection between first profile strip and the second profile strip is greater than the yield point of the thermoplastic processed material of first or second profile strip.

18. The lightweight board according to claim 6, wherein the first profile strip has a density of approximately 0.40 $g/cm^3$ to 0.70 $g/cm^3$.

19. The lightweight board according to claim 8, wherein the surface of the first profile strip has a roughness depth of approximately 10 μm to 25 μm.

20. The lightweight board according to claim 1, wherein first and second opposing recesses formed in the first and second layers, respectively, define the groove made in the at least one longitudinal side of the lightweight board between the first and second layers.

21. The lightweight board according to claim 1, wherein the first profile strip is connected by adhesion to the first and second layers.

* * * * *